US 7,696,921 B1

(12) United States Patent
Finley et al.

(10) Patent No.: US 7,696,921 B1
(45) Date of Patent: Apr. 13, 2010

(54) SYSTEM AND METHOD FOR TURBULENCE DETECTION

(75) Inventors: Jeffery A. Finley, Cedar Rapids, IA (US); Daniel L. Woodell, Cedar Rapids, IA (US); John G. Conkling, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/116,116

(22) Filed: May 6, 2008

(51) Int. Cl.
G01S 13/00 (2006.01)
(52) U.S. Cl. ...................... 342/26 B; 342/73
(58) Field of Classification Search ............... 342/26
See application file for complete search history.

(56) References Cited

U.S. PATENT DOCUMENTS

| | | |
|---|---|---|
| 3,764,719 A | 10/1973 | Dell |
| 3,781,530 A | 12/1973 | Britland et al. |
| 3,781,878 A | 12/1973 | Kirkpatrick |
| 3,885,237 A | 5/1975 | Kirkpatrick |
| 4,043,194 A | 8/1977 | Tanner |
| 4,835,536 A | 5/1989 | Piesinger et al. |
| 4,914,444 A | 4/1990 | Pifer et al. |
| 4,940,987 A | 7/1990 | Frederick |
| 5,036,334 A | 7/1991 | Henderson et al. |
| 5,049,886 A | 9/1991 | Seitz et al. |
| 5,077,558 A | 12/1991 | Kuntman |
| 5,198,819 A | 3/1993 | Susnjara |
| 5,202,690 A | 4/1993 | Frederick |
| 5,291,208 A | 3/1994 | Young |
| 5,311,183 A * | 5/1994 | Mathews et al. .......... 342/26 B |
| 5,331,330 A | 7/1994 | Susnjara |
| 5,479,173 A | 12/1995 | Yoshioka et al. |
| 5,517,193 A | 5/1996 | Allison et al. |
| 5,521,603 A | 5/1996 | Young |
| 5,757,322 A | 5/1998 | Ray et al. |
| 5,771,020 A | 6/1998 | Markson et al. |
| 5,828,332 A | 10/1998 | Frederick |

(Continued)

FOREIGN PATENT DOCUMENTS

WO   WO 98/22834 A1   5/1998

(Continued)

OTHER PUBLICATIONS

U.S. Appl. No. 11/074,531, filed Mar. 8, 2005, Woodell et al.

(Continued)

*Primary Examiner*—Thomas H Tarcza
*Assistant Examiner*—Timothy A Brainard
(74) *Attorney, Agent, or Firm*—Matthew J. Evans; Daniel M. Barbiari

(57) ABSTRACT

A system and method of displaying an indication of a hazard associated on an aircraft display in an avionics system provides first radar pulses at a first pulse repetition frequency or having a first compression signature or carrier frequency. The system and method also provides second radar pulses at a second pulse repetition frequency higher than the first pulse repetition frequency or having a second compression signature or carrier frequency. The system and method receive radar returns associated with the first radar pulses and the second radar pulses and provide a turbulence assessment in response to the radar returns.

20 Claims, 5 Drawing Sheets

U.S. PATENT DOCUMENTS

| | | | |
|---|---|---|---|
| 5,907,568 | A | 5/1999 | Reitan, Jr. |
| 5,920,276 | A | 7/1999 | Frederick |
| 5,945,926 | A | 8/1999 | Ammar et al. |
| 6,138,060 | A | 10/2000 | Conner et al. |
| 6,154,169 | A | 11/2000 | Kuntman |
| 6,184,816 | B1 | 2/2001 | Zheng et al. |
| 6,198,429 | B1 * | 3/2001 | Fujikawa et al. ............ 342/176 |
| 6,201,494 | B1 | 3/2001 | Kronfeld |
| 6,208,284 | B1 | 3/2001 | Woodell et al. |
| 6,236,351 | B1 | 5/2001 | Conner et al. |
| 6,246,367 | B1 | 6/2001 | Markson et al. |
| 6,340,946 | B1 | 1/2002 | Wolfson et al. |
| 6,388,607 | B1 | 5/2002 | Woodell |
| 6,388,608 | B1 | 5/2002 | Woodell et al. |
| RE37,725 | E | 6/2002 | Yamada |
| 6,405,134 | B1 | 6/2002 | Smith et al. |
| 6,424,288 | B1 | 7/2002 | Woodell |
| 6,456,226 | B1 | 9/2002 | Zheng et al. |
| 6,512,476 | B1 | 1/2003 | Woodell |
| 6,549,161 | B1 | 4/2003 | Woodell |
| 6,560,538 | B2 | 5/2003 | Schwinn et al. |
| 6,577,947 | B1 | 6/2003 | Kronfeld et al. |
| 6,597,305 | B2 | 7/2003 | Szeto et al. |
| 6,603,425 | B1 | 8/2003 | Woodell |
| 6,606,564 | B2 | 8/2003 | Schwinn et al. |
| 6,650,275 | B1 | 11/2003 | Kelly et al. |
| 6,690,317 | B2 | 2/2004 | Szeto et al. |
| 6,720,906 | B2 | 4/2004 | Szeto et al. |
| 6,741,203 | B1 | 5/2004 | Woodell |
| 6,744,382 | B1 | 6/2004 | Lapis et al. |
| 6,788,043 | B2 | 9/2004 | Murphy et al. |
| 6,791,311 | B2 | 9/2004 | Murphy et al. |
| 6,839,018 | B2 | 1/2005 | Szeto et al. |
| 6,850,185 | B1 | 2/2005 | Woodell |
| 6,879,280 | B1 | 4/2005 | Bull et al. |
| 6,882,302 | B1 | 4/2005 | Woodell et al. |
| 7,042,387 | B2 | 5/2006 | Ridenour et al. |
| 7,082,382 | B1 | 7/2006 | Rose, Jr. et al. |
| 7,109,913 | B1 | 9/2006 | Paramore et al. |
| 7,200,491 | B1 | 4/2007 | Rose, Jr. et al. |
| 2003/0001770 | A1 | 1/2003 | Cornell et al. |
| 2003/0016156 | A1 | 1/2003 | Szeto et al. |
| 2003/0095609 | A1 * | 5/2003 | Cowie et al. ................ 375/316 |
| 2004/0150552 | A1 * | 8/2004 | Barbella et al. ............. 342/109 |
| 2005/0049789 | A1 | 3/2005 | Kelly et al. |
| 2006/0036366 | A1 | 2/2006 | Kelly et al. |

FOREIGN PATENT DOCUMENTS

WO     WO 03/005060 A1     1/2003

OTHER PUBLICATIONS

Hodanish, S., "Integration of Lightning Detection System in a Modernized National Weather Service Office"; no date listed; National Weather Service Office in Melbourne, Florida, 5 pages.

"Meteorological/KSC/L71557/Lighting Detection and Ranging (LDAR)"; No author given; no date given; article information was last updated during Jan. 2002, 12 pages.

Nathanson, Fred E., "Radar and Its Composite Environment," *Radar Design Principles, Signal Processing and the Environment*, 1969, 5 pages, McGraw-Hill Book Company, New York et al.

Pessi, Antti et al., "On the Relationship Between Lightning and Convective Rainfall Over the Central Pacific Ocean," date unknown, pp. 1-9.

* cited by examiner

SYSTEM AND METHOD FOR TURBULENCE DETECTION

BACKGROUND

This application relates generally to the identification of turbulence. More particularly, this application relates to the identification of turbulence at multiple ranges through pulse adaptation.

Hazardous weather is generally associated with convective weather cells. Convective weather cells can produce turbulence, high winds, lightning, hail, and other weather hazards. With the large amount of air traffic and rising fuel costs, pilots are interested in identifying convective cells (e.g., often hazardous weather) from non-convective cells (e.g., stratiform rain) so they do not unnecessarily avoid flight routes through non-hazardous weather.

Lightning is generally caused by an updraft of induced charges. Generally, cells that are producing lightning are turbulent and have the capacity to produce hail. Therefore, the presence of lightning in a particular area can be an indication of the presence of a convective cell or at least a potentially hazardous weather region.

Weather radar systems generally include an antenna, a receiver/transmitter circuit, a processor, and a display. The processor is coupled between the display and the receiver/transmitter circuit. The receiver/transmitter circuit is coupled between the processor and the antenna. The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft also include other aircraft weather radar systems such as a turbulence detection system. The turbulence detection system can provide indications of the presence of turbulence or other hazards.

Conventional aircraft hazard weather radar systems, such as the WXR 2100 MultiScan™ radar system manufactured by Rockwell Collins, Inc., have Doppler capabilities and are capable of detecting four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta.

Although radar-detected reflectivity and radar-detected velocity variation are correlated to aircraft hazards, they may not provide a complete picture to the pilot. For example, rainfall rates derived from radar reflectivity data are generally related to the most visible weather related advisory on the flight deck. However, heavy rain is not inherently hazardous to the aircraft. Heavy rain is displayed to the flight crew because it is often associated with true weather hazards such as lightning, hail, and turbulence.

Some weather radar systems incorporate turbulence detection functions. In areas of reasonably high reflectivity, conventional aircraft weather radar systems can detect variation in the velocity signatures within thunderstorms. This velocity variation, or spectral width in radar terminology, is correlated to turbulence within the storm.

The radar detection range of turbulence is conventionally dictated by the frequency at which pulses are transmitted. The radar energy must have time to make the round trip between radar and turbulence before another pulse can be transmitted. Very rapid pulses can result in very sensitive, short range detection. Slower transmission rates can result in less sensitive, longer long range detections Thus, there is a need for a system and method for more versatile measurement of turbulence. There is also a need for a system and method capable of identifying turbulence with both long range detection and high sensitivity.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the application relates to an aircraft weather radar system including an antenna. The aircraft weather radar system comprises an input for receiving data associated with weather radar returns received by the antenna and a processor for determining a presence of a hazard in response to the data. The processor causes the antenna to provide a first scan using a first pulse repetition frequency for a longer range and a second scan using a second pulse repetition frequency for a shorter range, whereby more sensitive turbulence detection is achieved.

Another embodiment of the application relates to an aircraft weather radar system including an antenna. The aircraft weather radar system comprises an input for receiving data associated with weather radar returns received by the antenna and a processor for determining a presence of a hazard in response to the data. The processor causes the antenna to provide a first scan using a first pulse repetition frequency for a longer range and changes the pulse repetition frequency to a second pulse repetition frequency for a shorter range during an azimuth interval associated with detected weather.

Another embodiment of the application relates to an aircraft weather radar system including an antenna. The aircraft weather radar system comprises an input for receiving data associated with weather radar returns received by the antenna and a processor for determining a presence of a hazard in response to the data. The processor causes the antenna to provide at least two interleaved pulse patterns in a single radial. The pulse patterns include a first pattern and a second pattern and the first pattern includes a first compression signature or carrier frequency and the second pattern includes a second compression signature or carrier frequency.

Another embodiment of the application relates to a method of displaying an indication of a hazard associated on an aircraft display in an avionics system. The method comprises providing first radar pulses at a first pulse repetition frequency or having a first compression signature or carrier frequency, providing second radar pulses at a second pulse repetition frequency higher than the first pulse repetition frequency or having a second compression signature or carrier frequency, receiving radar returns associated with the first radar pulses and the second radar pulses, and providing a turbulence assessment in response to the radar returns.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
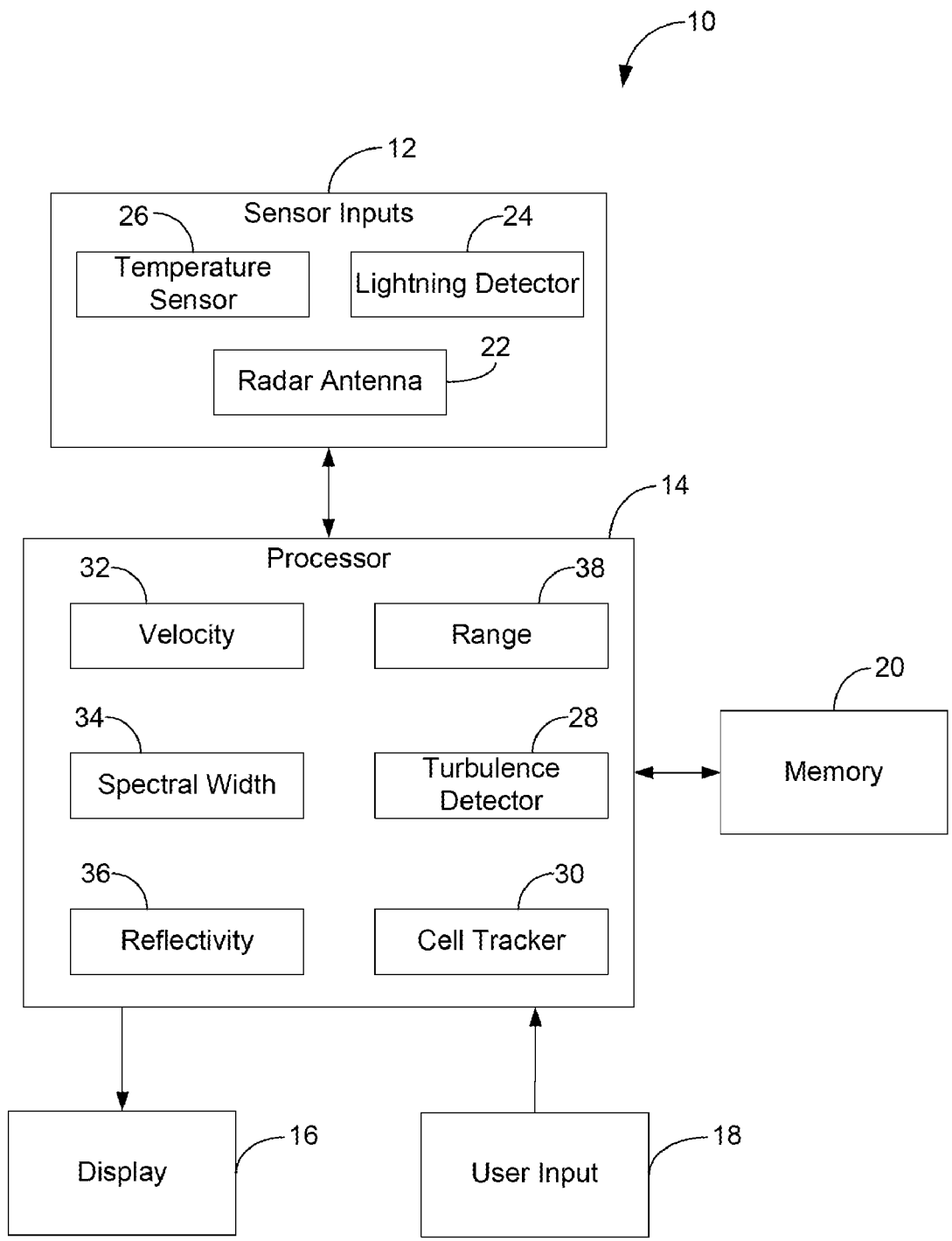
FIG. 1 is a block diagram of an aircraft weather radar system according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

An aircraft weather radar system or other avionics system may directly detect turbulence based on velocity readings from a Doppler radar. The current regulatory environment as defined by governmental regulatory agencies supports display of basic radar sensor information as red, yellow, and green for radar reflectivity calibrated to rainfall rate and magenta as turbulence. The regulatory agencies do not currently provide guidance for changing the definition of the radar display based on inferred hazards. The radar display format may be selected to display radar colors consistent with turbulence and rainfall rate as currently defined by regulatory authorities. A hazard assessment indication can be provided in a manner that does not interfere with display of standard weather data.

Referring to FIG. 1, a hazard warning system or aircraft weather radar system 10 includes sensor inputs 12, a processor 14, a display 16, a user input 18, and a memory 20. Aircraft weather radar system 10 may acquire horizontal reflectivity profiles and direct turbulence detection information via sensor inputs 12. Sensor inputs 12 generally include a radar antenna 22, a lightning detector 24, and a temperature sensor 26. According to other exemplary embodiments, sensor inputs 12 may include any type of sensor or detector that may provide data related to direct or inferred measurement or detection of weather conditions and/or hazards.

Processor 14 is generally configured to process data received from sensor inputs 12 to determine a hazard threat level, receive input from user input 18, and provide hazard indication on display 16. Processor 14 includes a direct turbulence detector 28 and a cell tracker 30. Processor 14 can generate a velocity parameter 32 or other Doppler data, a spectral width parameter 34, a reflectivity parameter 36, and a range parameter 38 based on return data from sensor inputs 12, data or commands from user input 18, or data or instructions from memory 20. According to various exemplary embodiments, processor 14 can be any hardware and/or software processor or processing architecture capable of executing instructions and operating on data related to hazard detection. According to one exemplary embodiment, memory 20 may be an inertial memory or inertial memory system. The inertial memory or inertial memory system may be any memory or memory system in which data storage and extraction compensates for the translational and/or rotational movement of the aircraft. According to various exemplary embodiments, memory 20 can be any volatile or non-volatile memory capable of storing data and/or instructions related to aircraft weather radar system 10.

Direct turbulence detector 28 is configured to provide turbulence data based on a direct measurement of velocity, for example velocity parameter 32 or spectral width parameter 34, from radar antenna 22. In areas of reasonably high reflectivity, conventional aircraft weather radar systems can detect variation in the velocity signatures within thunderstorms. This velocity variation or spectral width is correlated to turbulence within the storm. Direct turbulence detector 28 can provide a turbulence hazard indications on display 16.

Processor 14 can process at least one of parameters 32, 34, 36, 38 and/or data from detector 24 to provide other hazard detection indications on display 16, for example lightning, hail, or inferred turbulence. Processor 14 may infer whether a turbulence hazard is present based on measurements of radar reflectivity, lightning, and/or temperature. In addition, processor 14 can cause system 10 to perform further analysis in light of information from lightning detector 24 and/or a parameter 32, 34, 36, 38. The further analysis can even include causing system 10 to perform weather radar queuing and control in azimuth and elevation as well as examining new data or historical data.

Threat descriptions on display 16 can include lightning, hail, and turbulence. All three hazards can have substantial impact on airline operations and may be blended with a weather radar's threat assessments at shorter ranges. Display 16 should allow slewing from the full cell identification of convective weather at long ranges to a shorter range sub-cell size regions of likely hazard.

After acquiring data from sensor inputs 12, processor 14 may use a variety of processing techniques to assess the weather hazard level. Processor 14 may identify and track relevant weather cells via cell tracker 30. The cells may be prioritized in terms of their threat to the aircraft and detailed vertical scans can be conducted on high priority targets.

Figure 2:
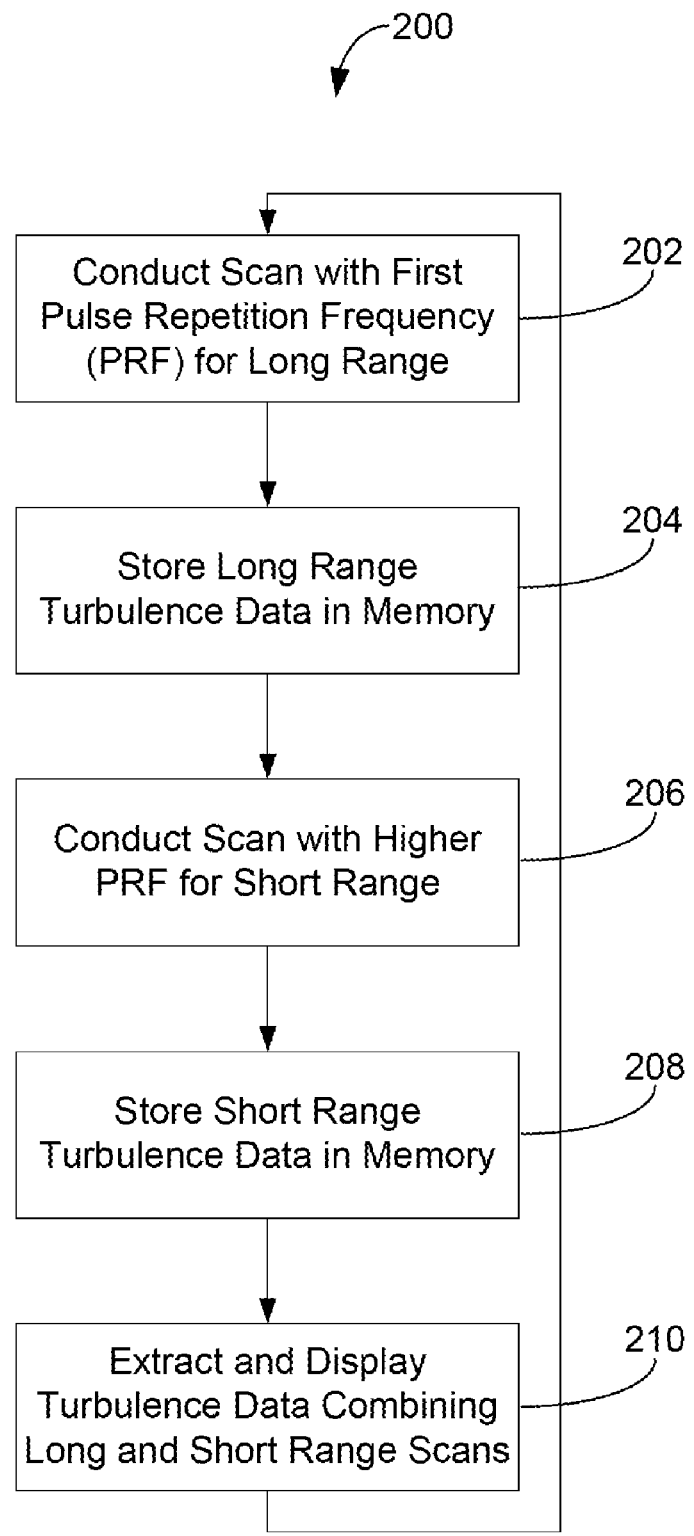
FIG. 2 is a process flow diagram illustrating a turbulence detection method of the aircraft weather radar system of FIG. 1 according to an exemplary embodiment.

Referring to FIG. 2, a method 200 may be executed on processor 14 to detect turbulence by changing the radar transmission rates from scan to scan according to an exemplary embodiment.

Processor 14 conducts a full scan with a pulse repetition rate appropriate for long range turbulence detection (step 202). This rate may allow for detection of weather with a large spectral width (e.g., highly turbulent) and high reflectivity. For example, a pulse repetition frequency (PRF) of 1839 Hz can detect turbulence at ranges of less than about 44 nautical miles (nmi). According to another exemplary embodiment, the PRF may be lower than or below 1839 Hz. According to other exemplary embodiments, the PRF may be of any frequency and the detection range may be estimated by the equation:

$$\text{Range (nm)} = \frac{1 \times 10^6}{12.34 \times PRF(\text{Hz})} \quad (1)$$

The long range turbulence detection data received from the radar scans of step 202 is stored in memory 20 (step 204). According to one exemplary embodiment, the long range turbulence data may be stored in an inertial memory or inertial memory system. According to other exemplary embodiments, the long range turbulence data may be stored in any type of volatile or non-volatile memory capable of storing data related to turbulence.

Processor 14 follows the long range radar sweep with a sweep of a higher PRF for a shorter range of turbulence detection (step 206). This sweep may provide more sensitive detection at lower spectral widths and for weather with low reflectivity. For example, a PRF of 3000 Hz can detect turbulence at a range of less than about 26 nmi. According to another exemplary embodiment, the PRF may be greater than or above 1839 Hz. According to another exemplary embodiment, the PRF may be greater than 3000 Hz. According to other exemplary embodiments, the PRF may be any frequency with the detection range calculated using equation (1).

The short range turbulence detection data received from the radar scans of step 206 is stored in memory 20 (step 208). According to one exemplary embodiment, the short range turbulence data may be stored in an inertial memory or inertial memory system. According to other exemplary embodiments, the short range turbulence data may be stored in any type of volatile or non-volatile memory capable of storing data related to turbulence. According to various exemplary embodiments, the short range turbulence data can be stored in the same memory or a different memory than the long range turbulence data.

Processor 14 extracts short and long range turbulence data from memory 20 and displays it together on display 16 (e.g., a vertical or horizontal display view) providing an illustration combining the long and short range turbulence data (step 210), whereby more sensitive turbulence detection is achieved using the two scans. Processor 14 then begins a new long range scan at step 202. It is noted that according to other exemplary embodiments, processor 14 may conduct more than two PRF scans.

Figure 3:
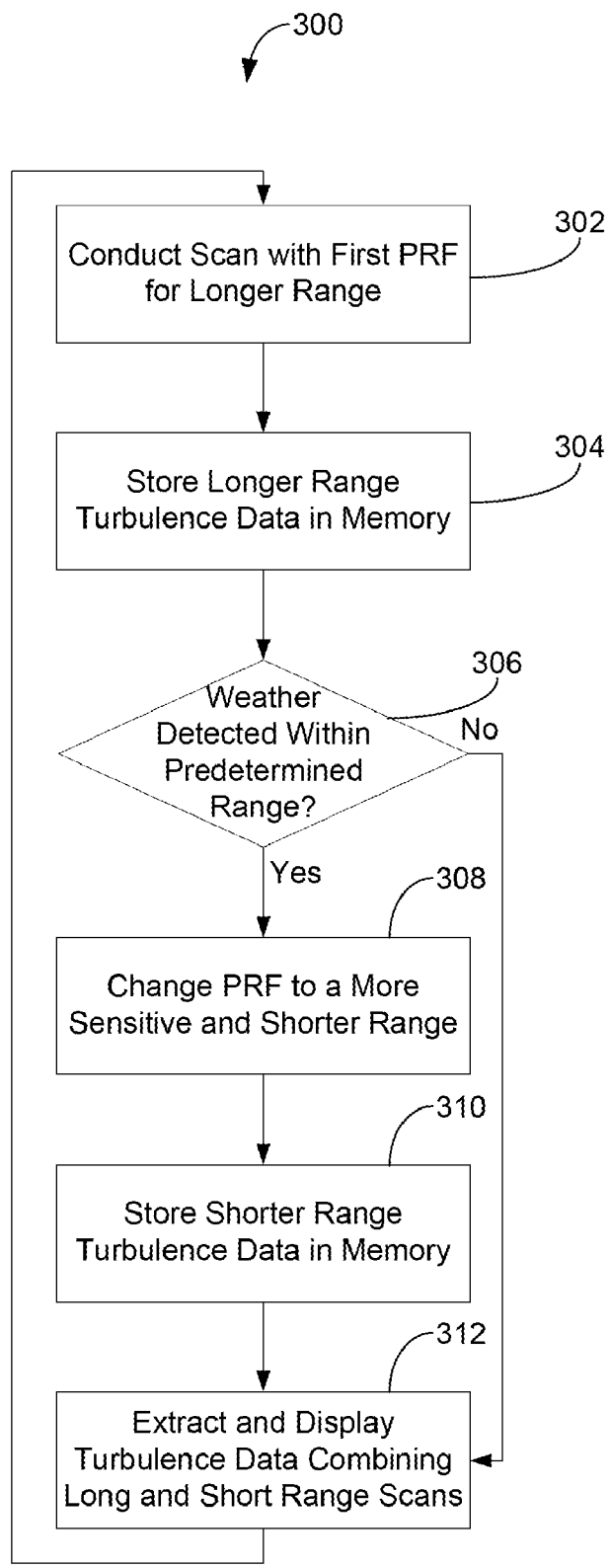
FIG. 3 is a process flow diagram illustrating a turbulence detection method of the aircraft weather radar system of FIG. 1 according to an exemplary embodiment.

Referring to FIG. 3, a method 300 may be executed on processor 14 to detect turbulence by selectively modifying the radar transmission rate to target close range weather according to an exemplary embodiment.

Processor 14 conducts a scan with a nominal, long range PRF (step 302) to allow for detection of weather with a large spectral width (e.g., highly turbulent) and high reflectivity. For example, a pulse repetition frequency (PRF) of 1839 Hz can detect turbulence at ranges of less than about 44 nautical miles (nmi). According to another exemplary embodiment, the PRF may be lower than or below 1839 Hz. According to other exemplary embodiments, the PRF may be any frequency with the detection range calculated using equation (1).

The long range turbulence detection data received from the radar scans of step 302 is stored in memory 20 (step 304). According to one exemplary embodiment, the long range turbulence data may be stored in an inertial memory or inertial memory system. According to other exemplary embodiments, the long range turbulence data may be stored in any type of volatile or non-volatile memory capable of storing data related to turbulence.

Processor 14 analyzes the data from the scan of step 302 to see if any weather is detected within a predetermined range (step 306). If weather is detected within the predetermined range, processor 14 changes the PRF during the azimuth interval in which the weather has been detected to a shorter range with higher sensitivity (step 308). For example, if the scan detects weather within about 26 nmi, processor 14 may change the PRF to 3000 Hz. According to various exemplary embodiments, the PRF may be modified within the current scan or in the azimuth interval in subsequent scans.

The short range turbulence detection data received from the radar scans of step 308 is stored in memory 20 (step 310). According to one exemplary embodiment, the short range turbulence data may be stored in an inertial memory or inertial memory system. According to other exemplary embodiments, the short range turbulence data may be stored in any type of volatile or non-volatile memory capable of storing data related to turbulence. According to various exemplary embodiments, the short range turbulence data can be stored in the same memory or a different memory than the long range turbulence data.

Processor 14 extracts short and long range turbulence data from memory 20 and displays it together on display 16 (e.g., a vertical or horizontal display view) providing an illustration combining the long and short range turbulence data (step 312). If processor 14 does not detect any weather within the predetermined distance, the turbulence data may be extracted and the display may be updated with any new long range turbulence data (step 312). Processor 14 then begins a new long range scan at step 302.

It is noted that according to other exemplary embodiments, processor 14 may conduct more than two PRF scans. According to other exemplary embodiments, processor 14 may not check for close range weather after each long range scan, but after short range weather is detected may automatically alternate between long and short range scans for a predetermined time period or until one or both of the scans does not detect further close range weather. The PRF may be modified within the current scan or in the azimuth interval in subsequent scans.

Figure 4:
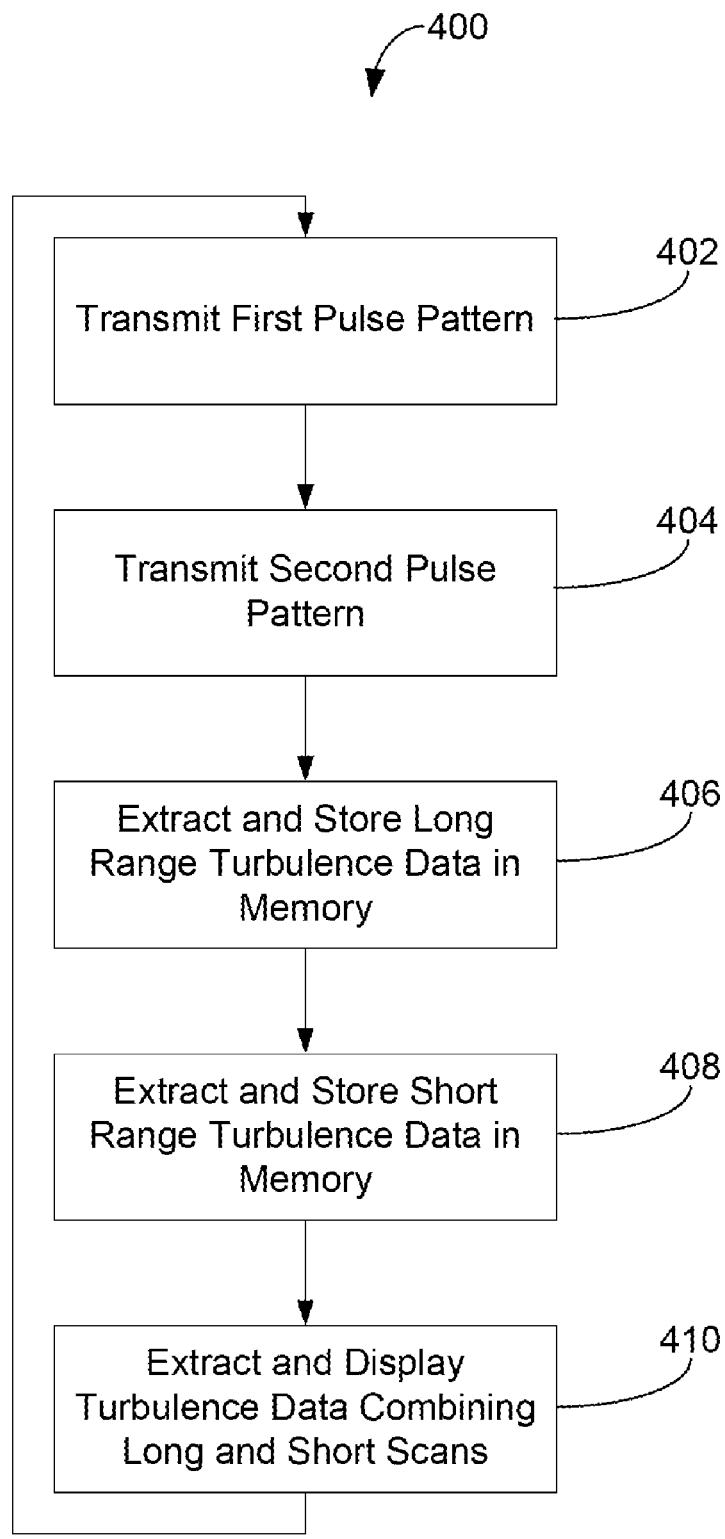
FIG. 4 is a process flow diagram illustrating a turbulence detection method of the aircraft weather radar system of FIG. 1 according to an exemplary embodiment.

Referring to FIG. 4, a method 400 may be executed on processor 14 to detect turbulence by interleaving two separable pulse patterns within a single radial according to an exemplary embodiment.

Processor 14 conducts a scan with a first pulse pattern having a first pulse compression signature or carrier frequency (step 402) and interleaved with a second pulse pattern having a second pulse compression signature or carrier frequency in the same radial (step 404). In an exemplary embodiment using BPSK pulse compression, the compression signatures may correspond to two independent phase codes. According to other exemplary embodiments, the first and/or second compression signature may be a phase coded signature, a frequency coded signature, an amplitude coded signature, or any combination thereof. The pulses can be alternately transmitted at an interval corresponding to a highly sensitive short range interval, for example about 3000 Hz (e.g., within about 26 ml), about 15 kHz (e.g., within about 5.4 ml), or more.

In one exemplary embodiment, a pulse encoded with a first pulse compression pattern is transmitted. After a period of time corresponding to a desired pulse repetition frequency (e.g., 3000 Hz) a second pulse is transmitted and encoded with a compression pattern that is different and separable from the first pulse compression pattern. Following the transmission of the second pulse, the radar receives return signals from both the first and second pulses substantially simultaneously. The radar separates the returns from the first and second pulses by matching the received signal with the compression codes from the first and second pulses with two separate matched filters. The first matched filter corresponds to the compression code from the first pulse and the second matched filter corresponds to the compression code from the second pulse. In this way, the long range returns from the first pulse can be separated from the short range returns from the first pulse.

A third pulse is transmitted with the same pulse compression code as the first pulse and two separate matched filters are used to separate the long range returns of the second pulse from the short range returns of the third pulse. The process repeats for the duration of the scan.

This exemplary embodiment allows more sensitive, higher, pulse repetition frequencies to be used for turbulence detection while providing detection at twice the range conventionally expected for the PRF.

In another exemplary embodiment, a pulse is transmitted with a first carrier frequency. After a period of time corresponding to a desired pulse repetition frequency (e.g., 3000 Hz) a second pulse is transmitted with a second carrier frequency that is different and separable from the first pulse carrier frequency. Following the transmission of the second pulse the radar receives return signals from both the first and second pulses substantially simultaneously. The radar separates the returns from the first and second pulses by providing two receiver filters, one tuned to the carrier frequency of the first pulse and the second tuned to the carrier frequency of the second pulse. In this way, the long range returns from the first pulse can be separated from the short range returns from the second pulse.

A third pulse is transmitted with the same carrier frequency as the first pulse and the two receiver filters are used to separate the long range returns from the second pulse from the short range returns from the third pulse. The process repeats for the duration of the scan.

Processor 14 extracts and stores the long range turbulence data of the radar return into memory 20 (step 406) as well as extracting and storing the short range turbulence data from the return (step 408). Since the pulses are separable by their return phase code signatures or carrier frequencies, processor 14 can obtain high PRF data at a range corresponding to twice that available with a single coded 3000 Hz signal, for example 50 nmi versus 25 nmi. Both high sensitivity and long range scans can be incorporated into a single radial.

According to one exemplary embodiment, the long range turbulence data may be stored in an inertial memory or inertial memory system. According to other exemplary embodiments, the long range turbulence data may be stored in any type of volatile or non-volatile memory capable of storing data related to turbulence. According to various exemplary embodiments, the short range turbulence data can be stored in the same memory or a different memory than the long range turbulence data.

Processor 14 extracts short and long range turbulence data from memory 20 and displays it together on display 16 (e.g., a vertical or horizontal display view) providing an illustration combining the long and short range turbulence data (step 410). Processor 14 then begins a new scan at step 402. It is noted that according to other exemplary embodiments, processor 14 may interleave more than two separable code patterns or carrier frequencies or may interleave various combinations of code patterns and carrier frequencies.

According to various exemplary embodiments, the process flow of FIGS. 2-4 may be embodied as hardware and/or software. In exemplary embodiments where the processes are embodied as software, the processes may be executed as computer code on any processing or hardware architecture or in any weather radar system such as the WXR-200 available from Rockwell Collins, Inc.

Figure 5:
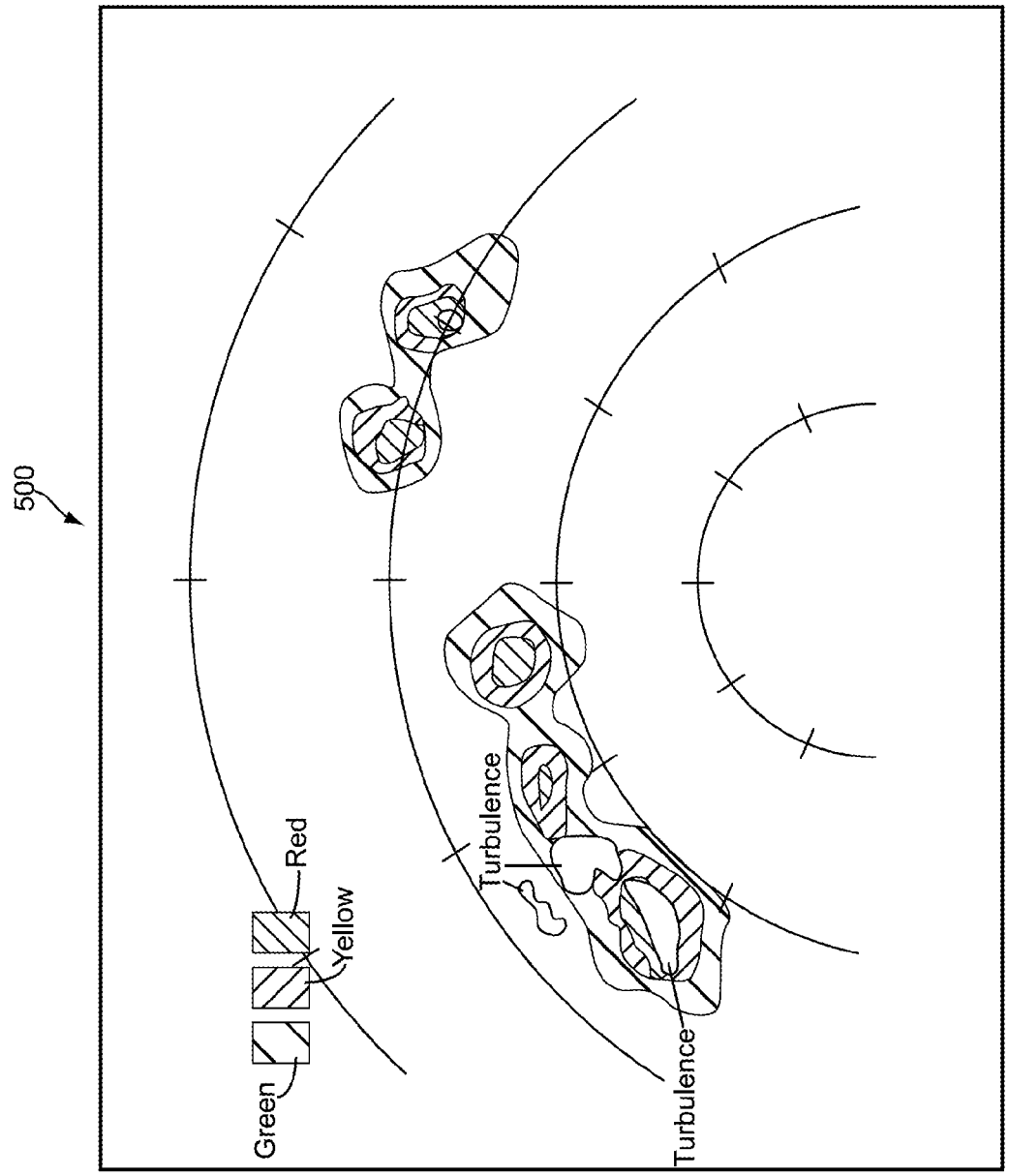
FIG. 5 is a screenshot of the horizontal display in the weather radar system of FIG. 1 according to an exemplary embodiment.

Referring to FIG. 5, a screenshot 500 of display 16 provides reflectivity scaled as moisture content and turbulence scaled to RMS vertical load according to an exemplary embodiment. The moisture content may be illustrated by the colors green, yellow, and red (represented by the legend in the FIG) and the turbulence may be represented as another color such as magenta.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft weather radar system including an antenna, the aircraft weather radar system comprising:
    an input for receiving data associated with weather radar returns received by the antenna; and
    a processor for determining a presence of a hazard in response to the data, wherein the processor causes the antenna to provide a first scan using a first pulse repetition frequency for a longer range and a second scan using a second pulse repetition frequency for a shorter range, whereby more sensitive turbulence detection is achieved, wherein the first scan is provided first and if data associated with the first scan indicates a presence of weather, the second scan is provided, wherein the first scan is followed by a third scan at the first pulse repetition frequency if the weather is not present.

2. The aircraft weather radar system of claim 1, wherein the data associated with the first scan and the second scan is stored in an inertial memory.

3. The aircraft weather radar system of claim 1, wherein the weather radar system is for use with a display, wherein the processor causes the display to display turbulence indications.

4. The aircraft weather radar system of claim 1, wherein the first scan is for long range turbulence detection and the second scan is for short range turbulence detection or vice versa.

5. An aircraft weather radar system including an antenna, the aircraft weather radar system comprising:
    an input for receiving data associated with weather radar returns received by the antenna; and
    a processor for determining a presence of a hazard in response to the data, wherein the processor causes the antenna to provide a first scan using a first pulse repetition frequency for a longer range and changes the pulse repetition frequency to a second pulse repetition frequency for a shorter range during an azimuth interval associated with detected weather.

6. The aircraft weather radar system of claim 5, wherein the weather radar system is for use with a display, wherein the processor causes the display to display turbulence indications.

7. The aircraft weather radar system of claim 5, wherein the data for the first scan and during the azimuth interval is combined in an inertial memory.

8. An aircraft weather radar system including an antenna, the aircraft weather radar system comprising:
an input for receiving return data associated with weather radar returns received by the antenna; and
a processor for determining a presence of a hazard in response to the return data, wherein the processor causes the antenna to provide at least two scans, wherein the scans comprise a first scan at a first pulse repetition frequency for a longer range and a second scan at a second pulse repetition frequency for a shorter range, wherein the first scan is provided first and first turbulence data for the first scan is stored in a memory and if weather is present, the second scan is provided and second turbulence data for the second scan is stored in the memory, wherein the first scan is followed by a third scan at the first pulse repetition frequency if the weather is not present.

9. The aircraft weather radar system of claim 8, wherein the first scan comprises a lower pulse repetition frequency.

10. The aircraft weather radar system of claim 9, wherein the lower pulse repetition frequency is below 1840 Hz.

11. The aircraft weather radar system of claim 8, wherein the first scan comprises the first carrier frequency and the second scan comprises the second carrier frequency.

12. The aircraft weather radar system of claim 11, wherein the first carrier frequency and second carrier frequency are separable in the receiver.

13. A method of displaying an indication of a hazard associated on an aircraft display in an avionics system, the method comprising:
providing first radar pulses having a first pulse repetition frequency for a longer range;
determining a presence of detected weather using first radar returns associated with the first radar pulses;
providing second radar pulses at a second pulse repetition frequency for a shorter range during an azimuth interval associated with the detected weather;
receiving second radar returns associated with the second radar pulses; and
providing a turbulence assessment in response to the first and second radar returns.

14. The method of claim 13, further comprising skipping the second providing step when the detected weather is not present.

15. The method of claim 13, wherein the second radar pulses are only provided in azimuth intervals associated with detected weather.

16. The method of claim 13, wherein the first and/or second pulses are a phase coded signature, a frequency coded signature, an amplitude coded signature, or a combination thereof.

17. The aircraft weather radar system of claim 13, wherein the first pulse repetition frequency is less than the second pulse repetition frequency.

18. The method of claim 17, wherein the second pulse repetition frequency is above 1839 Hz.

19. The method of claim 13, wherein the first pulse repetition frequency is at or below 1939 Hz.

20. The method of claim 13 wherein data associated with the radar returns is stored in inertial memory.

* * * * *